United States Patent
Allport et al.

(10) Patent No.: US 6,853,989 B2
(45) Date of Patent: *Feb. 8, 2005

(54) SYSTEM AND METHOD FOR SELECTING AND ACCOUNTING FOR VALUE-ADDED SERVICES WITH A CLOSED SYSTEM METER

(75) Inventors: Robert W. Allport, Harlow Essex (GB); Stephen Kelly, Hertfordshire (GB); Timothy J. Nicholls, Standon Herts (GB); Frederick W. Ryan, Jr., Oxford, CT (US)

(73) Assignee: Pitney Bowes Inc., Stamford, CT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 803 days.

(21) Appl. No.: 09/223,116
(22) Filed: Dec. 30, 1998

(65) Prior Publication Data

US 2001/0037320 A1 Nov. 1, 2001

(51) Int. Cl.[7] ............................................. G06F 17/00
(52) U.S. Cl. .......................... 705/401; 705/1; 705/400; 705/402; 705/406; 705/408
(58) Field of Search .......................... 705/400, 401–405, 705/408, 410, 1, 406

(56) References Cited

U.S. PATENT DOCUMENTS

| | | | |
|---|---|---|---|
| 4,639,873 A | 1/1987 | Baggarly et al. | |
| 4,725,718 A | 2/1988 | Sansone et al. | |
| 4,734,865 A | 3/1988 | Scullion et al. | |
| 4,743,747 A | 5/1988 | Fougere et al. | |
| 4,797,830 A | 1/1989 | Baggarly et al. | |
| 4,831,554 A | 5/1989 | Storace et al. | |
| 4,831,555 A | 5/1989 | Sansone et al. | |
| 4,873,645 A | 10/1989 | Hunter et al. | |
| 4,959,795 A | 9/1990 | Christensen et al. | ........ 364/464 |
| 5,008,827 A | 4/1991 | Sansone et al. | |
| 5,024,153 A | 6/1991 | Bannister et al. | |
| 5,039,075 A | 8/1991 | Mayer | |
| 5,043,908 A | 8/1991 | Manduley et al. | |

(List continued on next page.)

FOREIGN PATENT DOCUMENTS

| | | | |
|---|---|---|---|
| EP | 0154972 A2 * | 3/1985 | ............ G07D/7/00 |
| EP | 0356228 | 8/1989 | |

(List continued on next page.)

OTHER PUBLICATIONS

"A game of logistics" Lisa A Yorgey, Target Marketing, v19n12 p56–62, Dec. 1996.*

(List continued on next page.)

Primary Examiner—James P. Trammell
Assistant Examiner—Calvin L. Hewitt, II
(74) Attorney, Agent, or Firm—Brian A. Lemm; Angelo N. Chaclas (57) ABSTRACT

System and method are provided for selecting and accounting for value-added services with a closed system metering device. A scanning device coupled to the closed system postage meter scans information, including recipient address, printed on a mailpiece. From the scanned information or manual selection, a selection of value-added services is made and the closed system metering device performs accounting related to the selected value-added services. The recipient address is combined with other information relating to postage payment for the mailpiece to obtain postal data relating to the mailpiece. The postal data is used to generate an indicium, which includes cryptographic evidencing of postage payment. A graphical representation of the selected value-added services is added to the generated indicium to generate a value-added indicium, which is then printed on the mailpiece.

12 Claims, 6 Drawing Sheets

U.S. PATENT DOCUMENTS

| | | | | |
|---|---|---|---|---|
| 5,058,030 | A | 10/1991 | Schumacher | |
| 5,072,400 | A | 12/1991 | Manduley | |
| 5,087,805 | A | 2/1992 | Silverschotz et al. | |
| 5,168,804 | A | 12/1992 | Lee et al. | |
| 5,177,687 | A | 1/1993 | Baggarly et al. | |
| 5,249,687 | A | 10/1993 | Rosenbaum et al. | |
| 5,387,783 | A | 2/1995 | Mihm et al. | |
| 5,390,251 | A | 2/1995 | Pastor et al. | |
| 5,437,441 | A | 8/1995 | Tuhro et al. | |
| 5,452,654 | A | 9/1995 | Connell et al. | |
| 5,454,038 | A | 9/1995 | Cordery et al. | |
| 5,490,077 | A | 2/1996 | Freytag | |
| 5,493,106 | A * | 2/1996 | Hunter | 235/375 |
| 5,509,109 | A | 4/1996 | Kim et al. | |
| 5,579,449 | A | 11/1996 | Strobel | |
| 5,586,036 | A | 12/1996 | Pintsov | |
| 5,657,689 | A * | 8/1997 | Lee | 101/91 |
| 5,703,783 | A | 12/1997 | Allen et al. | |
| 5,731,574 | A | 3/1998 | Bodie et al. | |
| 5,748,484 | A | 5/1998 | Cannon et al. | |
| 5,761,648 | A | 6/1998 | Golden et al. | |
| 5,801,944 | A | 9/1998 | Kara | |
| 5,819,240 | A | 10/1998 | Kara | 705/408 |
| 5,819,241 | A | 10/1998 | Reiter | 705/408 |
| 5,822,739 | A | 10/1998 | Kara | |
| 5,953,427 | A * | 9/1999 | Cordery et al. | 380/51 |
| 5,982,896 | A * | 11/1999 | Cordery et al. | 705/62 |
| 6,009,417 | A * | 12/1999 | Brookner et al. | 705/410 |
| 6,026,385 | A * | 2/2000 | Harvey et al. | 705/408 |
| 6,041,704 | A * | 3/2000 | Pauschinger | 101/91 |
| 6,061,670 | A * | 5/2000 | Brand | 705/404 |
| 6,064,994 | A * | 5/2000 | Kubatzki et al. | 705/410 |
| 6,081,795 | A * | 6/2000 | Ryan, Jr. | 705/408 |
| 6,108,643 | A | 8/2000 | Sansone | |
| 6,125,357 | A | 9/2000 | Pintsov | |
| 6,157,919 | A | 12/2000 | Cordery et al. | |
| 6,175,827 | B1 | 1/2001 | Cordery et al. | |
| 6,178,411 | B1 | 1/2001 | Reiter | |

FOREIGN PATENT DOCUMENTS

| | | |
|---|---|---|
| EP | 0604148 A2 | 12/1993 |
| EP | 0710930 | 10/1995 |
| EP | 0759596 | 8/1996 |
| WO | 97/14117 | 4/1997 |

OTHER PUBLICATIONS

Dougherty, Philip, "Advertising: Postage Stamp as Ad Medium" New York Times, Feb. 14, 1986, Sec. 4, Col. 1, p. 15 (Abstract Only).

United States Postal Service, (USPS), Information Based Indicia Program (IBIP) Indicium Specification, Jun. 13, 1996, Appendix A.

\* cited by examiner

Ad Data ← 207

| GRAPHIC IMAGE | ~207a |
| SUBSIDY RATE | ~207b |
| BILLING RATE | ~207c |
| GEOGRAPHIC RESTIRCTIONS | ~207d |
| RECIPIENT RESRTICTIONS | ~207e |
| DATE RESTRICTIONS | ~207f |
| MULTI-AD RESTRICTIONS | ~207g |
| AD SPACE RESTRICTIONS | ~207h |

SYSTEM AND METHOD FOR SELECTING AND ACCOUNTING FOR VALUE-ADDED SERVICES WITH A CLOSED SYSTEM METER

CROSS REFERENCE TO RELATED APPLICATIONS

This application is related to the following co-pending applications filed concurrently herewith and commonly assigned to the assignee of this application: U.S. patent applications Ser. Nos. 09/224,238; 09/222,642; 09/224,225; 09/222,644; 09/224,256; 09/223,504; and 09/223,643, all of which are specifically incorporated herein by reference.

FIELD OF THE INVENTION

The present invention relates generally to postage printing systems. More particularly, the present invention is directed to closed system postage meters that print digital indicia.

BACKGROUND OF THE INVENTION

Presently, there are two postage metering types: closed systems and open systems. In a closed system, the system functionality is solely dedicated to metering activity. Examples of closed system metering devices include conventional digital and analog (mechanical and electronic) postage meters wherein a dedicated printer is securely coupled to a metering or accounting function. In a closed system, since the printer is securely coupled and dedicated to the meter, printing evidence of postage cannot take place without accounting for the evidence of postage. In an open system, the printer is not dedicated to the metering activity, freeing system functionality for multiple and diverse uses in addition to the metering activity. Examples of open system metering devices include personal computer (PC) based devices with single/multi-tasking operating systems, multi-user applications and digital printers. An open system metering device is a postage evidencing device with a non-dedicated printer that is not securely coupled to a secure accounting module. Open system indicia printed by the non-dedicated printer are made secure by including addressee information in the encrypted evidence of postage printed on the mailpiece for subsequent verification.

Conventional closed system mechanical and electronic postage meters have heretofore secured the link between printing and accounting. The integrity of the physical meter box has been monitored by periodic inspections of the meters. Digital printing postage meters, which are closed system postage meters, typically include a digital printer coupled to a metering (accounting) device, which is referred to herein as a postal security device (PSD). Digital printing postage meters have removed the need for physical inspection by cryptographically securing the link between the accounting and printing mechanisms. In essence, new digital printing postage meters create a secure point to point communication link between the accounting unit and printhead. See, for example, U.S. Pat. No. 4,802,218, issued to Christopher B. Wright et al and now assigned to the assignee of the present invention. An example of a digital printing postage meter with secure printhead communication is the Personal Post Office™ manufactured by Pitney Bowes Inc. of Stamford, Conn. An example of a digital printing postage meter in a secure housing is the PostPerfect™ also manufactured by Pitney Bowes Inc. of Stamford, Conn.

Heretofore, closed system postage meters have generally been limited to printing postage indicia on mailpieces. Since open system postage meters, such as PC meter, have access to sender and recipient address information for each mailpiece, they have the capability to perform additional functions that are not available for closed system postage meters. For example, open system meters can perform address cleansing and other value-added services. Closed systems meters do not have such capability.

SUMMARY OF THE INVENTION

It has been found that closed system meters can print an open system indicium by scanning addressee information printed on a mailpiece before generating the indicium. In this manner, an indicium printed by a closed system meter is linked to a mailpiece. This potentially eliminates the need for closed system indicia. Consequently, there would be only one type of indicium printed and, therefore, only one verification system would be needed to verify all digitally printed indicium.

In operation, addressee information, such as a postal code or the entire address, is printed on the mailpiece, preferably in bar code format, when the envelope is addressed. The bar code is scanned by a bar code reader which is operatively coupled to a closed system postage meter, for example in a mailing machine that is processing the mailpiece. Alternatively, an optical character recognition (OCR) reader may scan an alphanumeric address printed on the mailpiece. The addressee information is then included in the information used to encode the indicium for postage evidencing. At verification, the indicium is verified using the same verification process used for verifying open system indicium.

An additional benefit has been found concerning the use by a closed system meter of addressee information scanned from a mailpiece. In accordance with the present invention, a closed system meter coupled to a scanner automatically detects requests for value-added services and accounts for the value-added services based upon information printed on the mail piece. Thus, the present invention increases the utility and value of such a closed system meter over conventional closed system meters.

A closed system meter is provided which scans destination address information from a mail piece in order to include at least some part of the destination address information in an indicium. The address may be in human readable or barcode format. The inclusion of the destination address information in the indicium enhances the security of a metering system by making the detection of duplicate indicia much easier. The present invention expands upon this idea by using the address information, as well as additional information printed on the mail piece, to allow the meter to request and account for value-added services, such as ad slogan brokering, certified mail or registered mail.

In accordance with the present invention, system and method are provided for selecting and accounting for value-added services with a closed system metering device. A scanning device coupled to the closed system postage meter scans information, including recipient address, printed on a mailpiece. From the scanned information or manual selection, a selection of value-added services is made and the closed system metering device performs accounting related to the selected value-added services. The recipient address is combined with other information relating to postage payment for the mailpiece to obtain postal data relating to the mailpiece. The postal data is used to generate an indicium, which includes cryptographic evidencing of postage payment. A graphical representation of the selected value-added services is added to the generated indicium to generate a value-added indicium, which is then printed on the mailpiece.

Therefore, it is now apparent that the present invention substantially overcomes the disadvantages associated with the prior art. Additional advantages of the invention will be set forth in the description, which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention. As shown throughout the drawings, like reference numerals designate like or corresponding parts.

DETAILED DESCRIPTION OF THE PREFERRED EMBODIMENTS

With the advent of PC metering systems, such as set forth in the IBIP Specifications and in U.S. Pat. Nos. 4,725,718, 4,743,747 and 5,781,438, the benefit of linking a mailpiece to an indicium has been recognized. The present invention enables closed system meters to link a destination address of a mailpiece to the indicium printed on the mailpiece. The IBIP Specifications contemplate value-added services being initiated directly by PC meter users. In accordance with the present invention, for the first time, closed system meters may be used to initiate value-added services. Furthermore, the present invention enables closed system meters to provide the brokering of ad space on envelopes.

Figure 1:
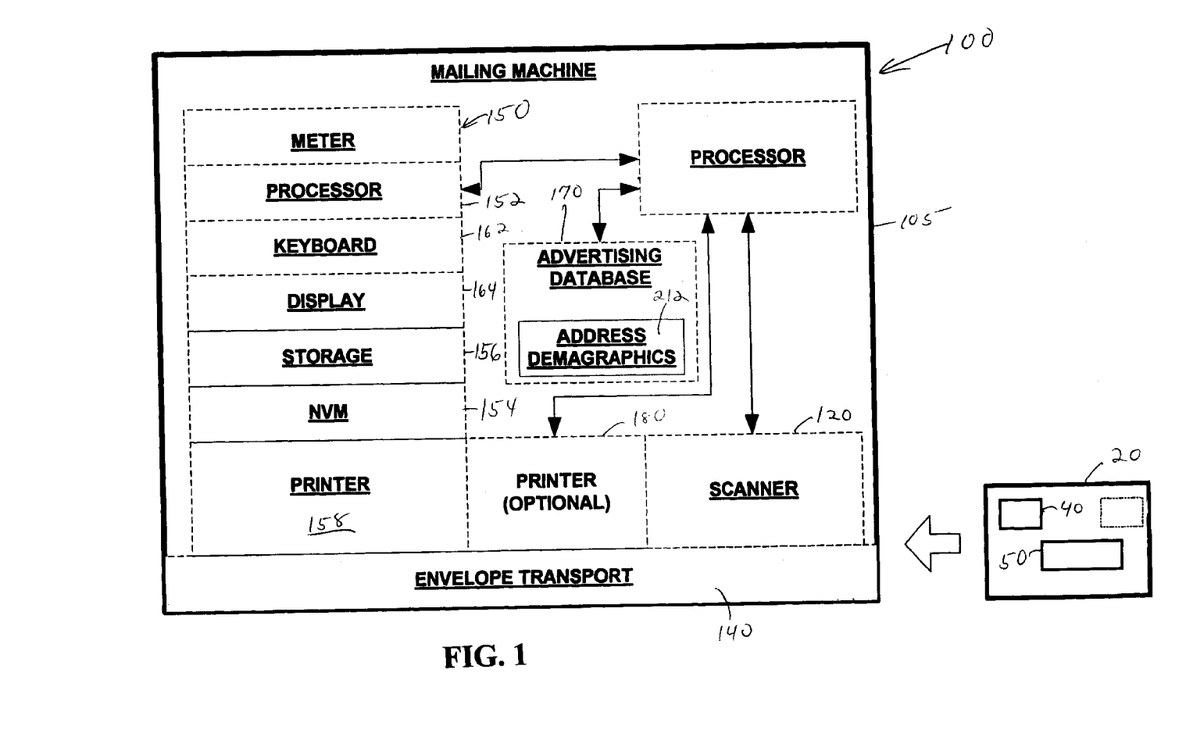
FIG. 1 is a preferred embodiment of a closed system metering device in accordance with the present invention.

Referring now to FIG. 1, a closed system metering device, generally designated 100, is shown for printing a postal indicia on envelope 20, which has an addressee block 50, and a return address 40. In a preferred embodiment of the present invention, the closed system metering device is a mailing machine, 105 coupled to a postage meter, generally designated 150. Mailing machine 105 includes a processor 110, a scanner 120, and an envelope transport 140. Meter 150 includes a processor 152, non-volatile memory (NVM) 154, storage means 156 and a digital printer 158. A typical closed system meter is described in more detail below. Scanner 120 preferably is a bar code scanner for scanning addressee information printed on envelope 20 in bar code format. Alternatively, scanner 120 may be an OCR reader for reading the alphanumeric addressee information printed on envelope 20. Mailing machine 105 further includes an optional advertising database 170 and an optional printer 180, both of which are used in the brokering of ad space on envelopes, which is described below.

The postage meter 150 includes a conventional printing module 158. In the preferred embodiment, the printing module 158 includes printing structure (not shown) such as any conventional thermal, ink jet, laser or other commercially available printing structure that is suitable for printing a digital indicium on envelope 20. Printing module 158 may include a conventional control circuit (not shown) which is connected to processor 152, as hereinafter described, and is conventionally constructed and arranged for communicating input signals thereto from the scanner 120, and communicating control signals therefrom for operation of the printing, feeding and value setting structures, under the control of the microprocessor 152. Postage meter 150 additionally includes a keyboard 162 and a display 164. In an alternate embodiment a conventional impact printing postage meter may be used as printing module 158.

The postage meter 150 also preferably includes a suitable NVM 154. The NVM 154 preferably includes: structure for storing descending register (total postage currently available for printing) and ascending register (total of all postage value increments which have ever been entered, and thus been made available to the printing module 158 for printing by the postage meter 150, during the life of the postage meter 150). Preferably, the NVM 154 additionally includes conventional structure for storing the serial number of the postage meter 150. Further, depending on the type of printing structure 158 utilized in the postage meter 150, the NVM 154 may include conventional structure for storing data corresponding to a graphic image of a postage indicium. Moreover, the NVM 154 is conventionally operable under the control of the microprocessor 152 for decrementing the descending register and incrementing the ascending register by an amount which is equal to the current requested postage value which is to be printed by the printing module 158.

Figure 2:
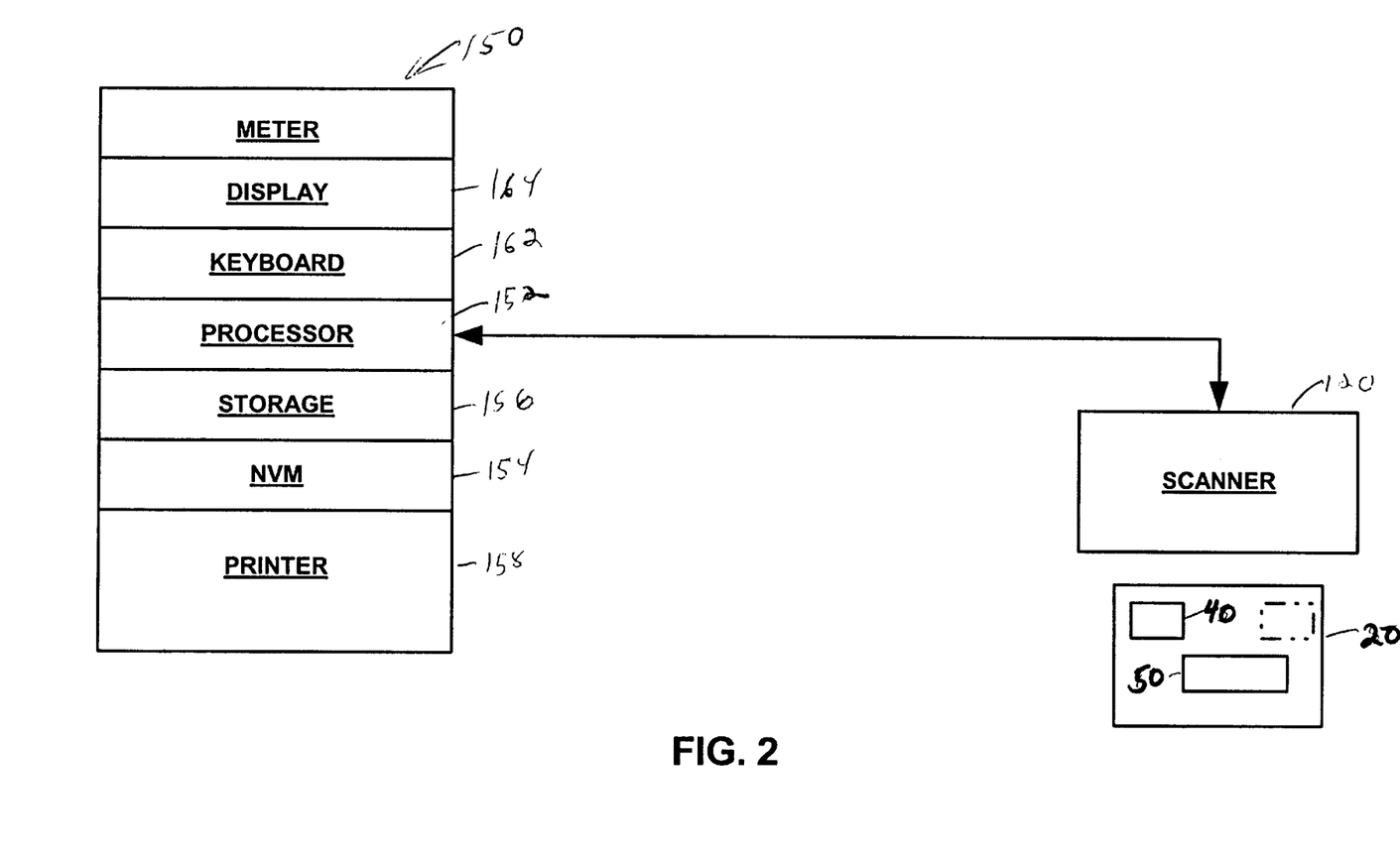
FIG. 2 is an alternate embodiment of a closed system metering device in accordance with the present invention.

Referring now to FIG. 2, a first alternate embodiment of the present invention is shown in which a scanner 120, such as a barcode reader or OCR reader, is added to an existing stand-alone, closed system postage meter 150. The closed system postage meter 150 is coupled to scanner 120 in a conventional manner. Meter 150 includes a processor 152, NVM 154, storage means 156 and a printer 158.

During mailpiece generation, elements of the address are used to generate a code specific to the mailpiece destination address. Such elements may be a postal code (zip code) or may include other elements such as a house number or street name. Once the code has been generated, it can be printed, preferably in bar code format, with the address, for example, in the address block of the mailpiece. A bar code is preferable because it is more reliable to scan in bar code than to OCR scan the alphanumeric characters from the address block of the mailpiece.

A scanner, such as a barcode reader or OCR reader, is coupled to an existing stand alone meter (FIG. 2) or to a mailing machine (FIG. 1). As the mailpiece passes under the scanner, information, such as addressee information and/or value-added services requests, is read from the mailpiece. The addressee information is scanned from the mailpiece and transmitted to the metering device so that it can be encoded into the indicium. If the addressee information is used to generate a cryptographic signature or digital token, then the address code can be scanned during the verification process to verify the validity of the indicium as well as providing a link back to the mailpiece. For a description of the generation of a digital token, see U.S. Pat. No. 5,781, 438, which is hereby incorporated by reference.

In accordance with the present invention, the scanned information is then processed to determine if value-added services are being requested. In an alternate embodiment, the value-added services are manually selected by a user and the information read from the mailpiece is used as appropriate in determining the scope of the services and the accounting for the services. If a value-added service is requested, the appropriate accounting for those services is performed in meter 150. Once the accounting is completed the proper indication of the requested service is printed on the mail piece by printer 180 in the preferred embodiment, or by printer 158 in the alternate embodiment. In addition, an ad slogan or coupon may be selected based upon the addressee or other data. Such ad brokering is described in more detail below.

Examples of the value-added services that may be offered are Certified Mail, Address Correction Requested, Insured, etc. In cases where it is necessary to fill out a form for these services meter 150 may either automatically fill out the form and print it either directly via printer 158 or via attached printer such as printer 180. Alternatively, meter 150 may send the necessary data to a computer for further processing.

Figure 3:
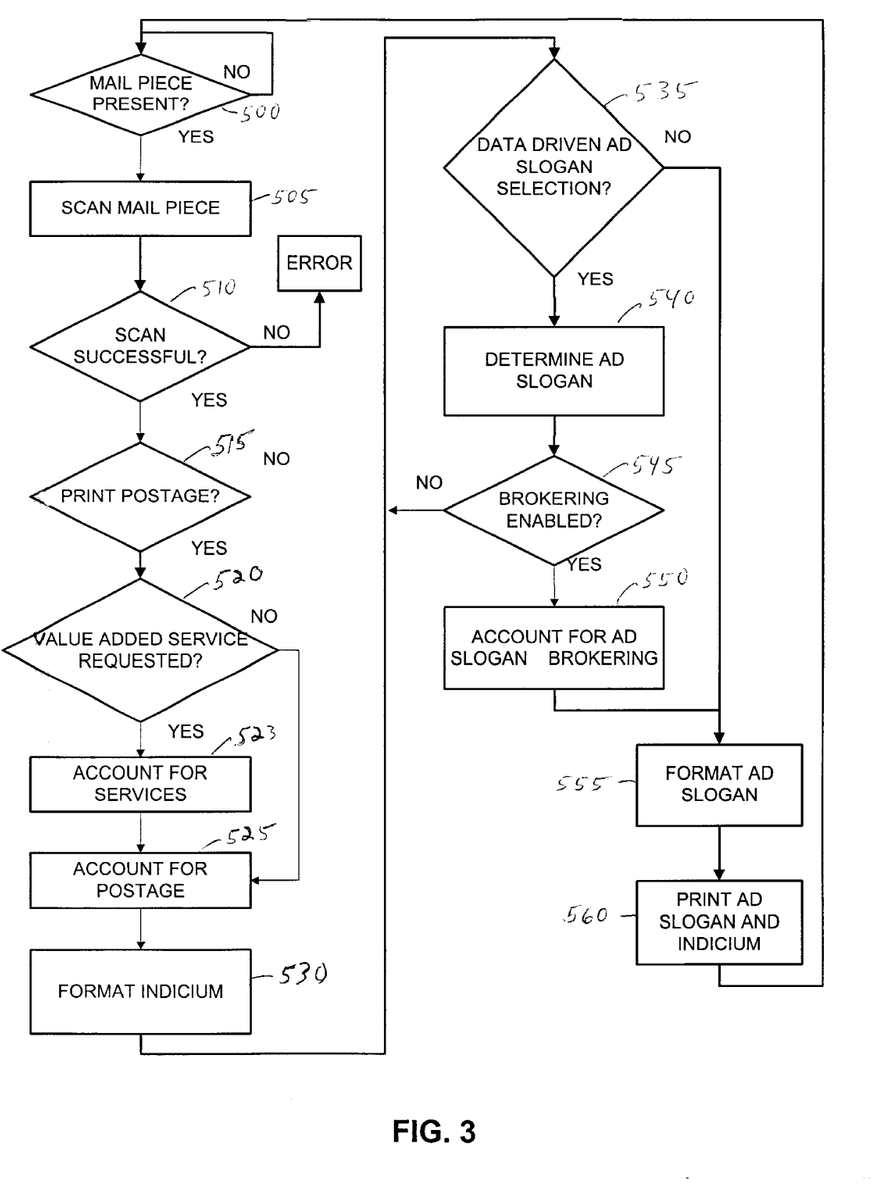
FIG. 3 is a flow chart of adding value-added services to closed system meter devices of FIGS. 1 and 2 in accordance with the present invention.

Referring now to FIG. 3, the process handling value-added services and ad/coupon brokering is shown. When a mailpiece is present at step 500, the mailpiece is scanned at step 505. If the scan was not successful at step 510, an error is indicated. If it was successful, then, at step 515, a check is made to determine whether postage is to be printed. If not, then the process continues to step 535. If postage is to be printed, then, at step 520, the scanned information is checked to determine whether value-added services are being requested. If value-added services have been requested, then at step 523 the type of value services being requested is determined and, using value-added rate tables, accounted for in registers, preferably the postal accounting registers, stored within the NVM 154 of the postage meter, and the process continues at step 525. If value-added services are not requested at step 520, the process continues at step 525, whereat the postage is accounted in the postal accounting registers within the NVM 154. At step 530, the meter formats the indicium based on any value-added services accounted for in step 525.

At step 535, a determination is made whether an ad slogan brokering is available. If not available, the meter prints only the indicium formatted in step 530. If available, then at step 540, the meter automatically determines the ad slogan or coupon to be printed, or preferably, a user of the meter selects from a set of ad slogans stored in the advertising database 170. In the preferred embodiment advertising database 170 comprises a set of ad slogans that have been downloaded to mailing machine 105 from a data center (not shown) in a manner similar to that described in previously noted related U.S. patent applications Ser. Nos. 09/224,238 and 09/224,256. Alternatively, the algorithms for determining a subset of available ad slogans may be present in mailing machine 105 as set forth below.

At step 545, a check is made to determine if the brokering feature for printing ad slogans is active in the meter. If not activated, the user has the option to activate the brokering feature or to bypass the feature and print only an indicium on the mailpiece. If activated, then at step 550, the meter accounts for the ad slogan/coupon brokering by adjusting the registers in an amount corresponding to a value of the ad/coupon to be printed on the mailpiece. At step 555, the meter/mailing machine formats the ad slogan/coupon. At step 560, the ad slogan/coupon and indicium are printed preferably by printer 180, or alternatively printer 158.

It is noted that printers 158 and 180 may be conventional stationary printers that print as envelope 20 is conveyed past. However, it will be understood that one or both of printers 158 and 180 may include movable printheads that move in an orthogonal path to the direction of envelope conveyance.

As previously stated, the present invention enables closed system meters to provide the brokering of ad space on envelopes. Should a user of the closed system meter 150 wish to "sell" advertising space on mail pieces, the system keeps a count (or an account) of the number of ads printed, and provides the capability to target those ads more directly to desired recipients. This targeting could be based on destination address (e.g. by zip code), sex (Mr. or Mrs.), or other information printed on the mail piece (including information printed in a barcode by the user. For a complete description of such ad brokering see previously noted related U.S. patent applications Ser. Nos. 09/224,238; 09/224,256; 09/223,504 and 09/223,643.

Figure 4:
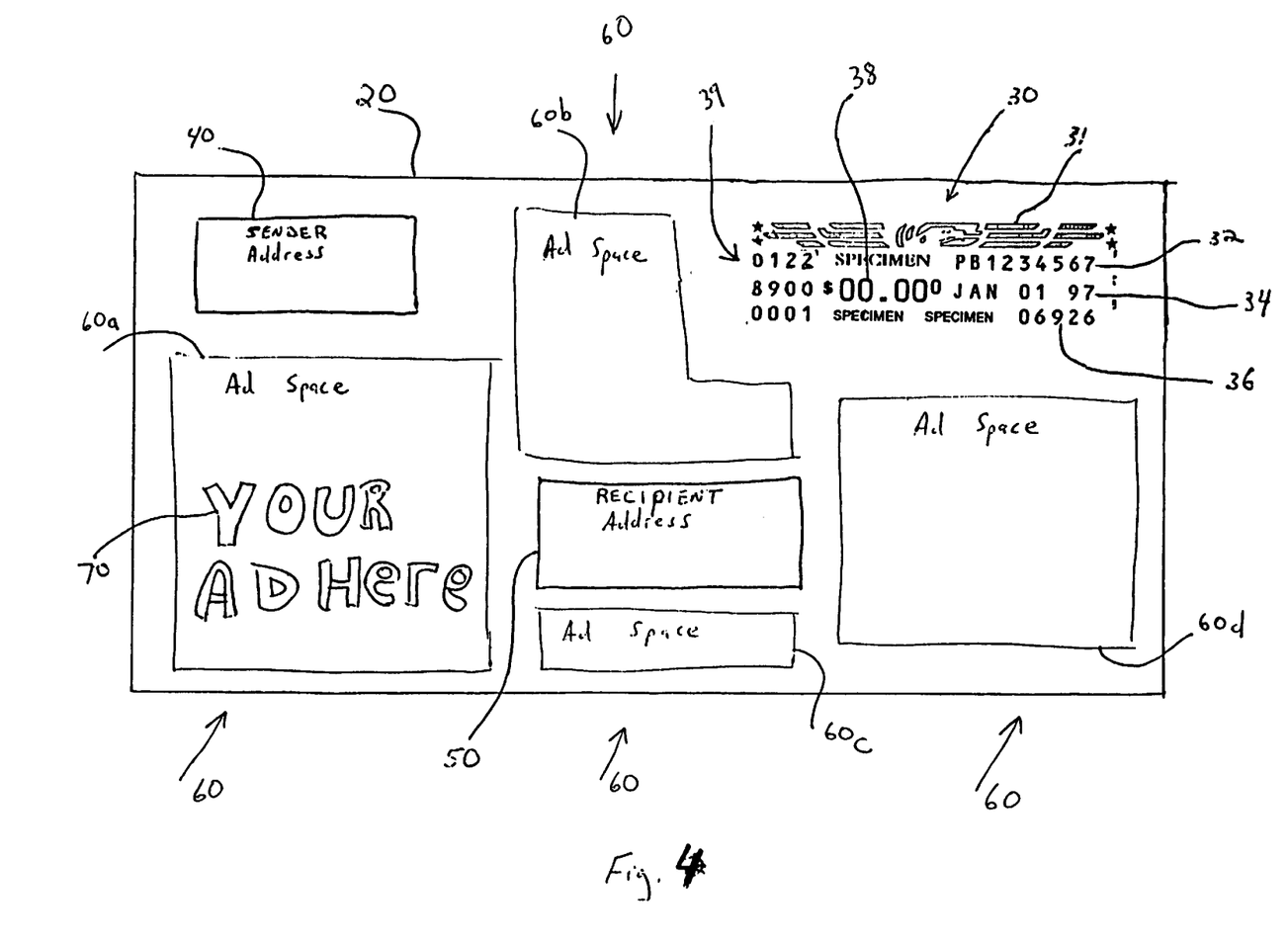
FIG. 4 is a front view of an envelope that has been processed by the postage printing system in accordance with the present invention.

Referring to FIG. 4, an envelope 20 having an example of a postal indicia 30, a sender address 40 and a recipient address 50 printed thereon is shown. The postal indicia 30 includes both fixed data that does not change from postal indicia to postal indicia and variable data that may change from postal indicia to postal indicia. Generally, the fixed data includes a graphic design 31 (an eagle with stars), a meter serial number 32 uniquely identifying the postage meter (not shown) that dispensed the postage and a licensing or receiving post office identifier (zip code) 36. Generally, the variable data includes a date 34 indicating when the postage was dispensed, a postal value 38 indicating an amount of postage and other data 39 for use by the postal authority in verifying the authenticity of the postal indicia 30 using conventional techniques. However, those skilled in the art will recognize that the exact content of both the fixed data and variable data is subject to regulation by the postal authority and a matter of design choice. For example, in a virtual meter environment the meter serial number 32 may not be used and the receiving post office identifier (zip code) 36 may be variable data. Moreover, any format (numeric, alpha-numeric, bar code, other symbology and the like) may be employed for the verification data 39.

The further details of the envelope 20 will now be described. In conventional fashion, the postage meter user may optionally place a sender or return address 40 in the upper, left hand corner of the envelope 20. As examples, the sender address 40 may be preprinted on the envelope 20, printed on an adhesive label and affixed to the envelope 20 or printed concurrently with the postal indicia 30 by the printer 120. The recipient address 50 represents the delivery point for the envelope 20. The remainder of the envelope 20 that is not occupied by the postal indicia 30, the sender address 40 and the recipient address 50 is available as advertising space 60 made up of a plurality of ad zones 60a, 60b, 60c and 60d. The advertising space 60 may contain one or more messages from third party advertisers.

In accordance with the present invention, closed system postage meter 150 includes an additional register in NVM 154 for maintaining an ad slogan/coupon credit account. The accounting for ad slogan/coupon register is performed by processor 152 but is done separately from the postage evidencing accounting relating to the traditional ascending and descending registers in NVM 154. The credit account maintained in an ad slogan/coupon register is reconciled on a periodic basis by a data center that refills and performs remote inspections of closed system postage meter 150. If coupons are being printed, the reconciliation may be performed by a coupon redemption center that processes such coupons printed on mailpieces. The credit read from the ad slogan/coupon register for ad slogans printed since the last reconciliation may be credited to the user's postal account or direct payment may be made to the user.

Advertising database 170, which may include an address demographics database 212, contains information concerning individual advertiser accounts, such as: advertiser name, advertiser address, preferred payment vehicle or arrangements (periodic invoice, direct credit card authorization, electronic funds transfer, etc.), ad data and the like, that have been established with the postage meter manufacturer. The address demographics database may employ any suitable database containing statistics relevant to certain geographic locations. As examples, various databases exist that contain detailed demographic information by zip code, such as: PRIZM available from Claritas Inc. (see Internet URL www.claritas.com), United States census information or any other database that is generally known and commercially available.

Figure 5:
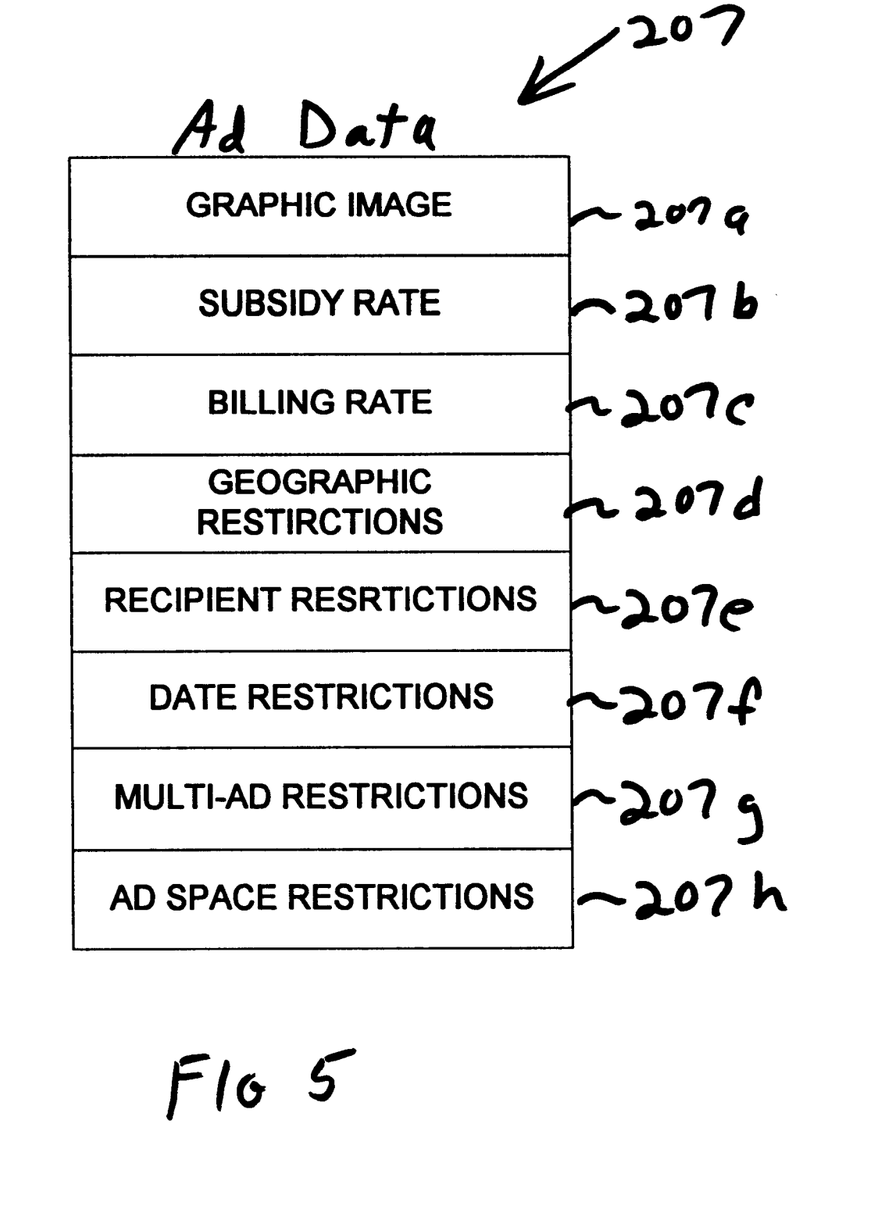
FIG. 5 is a schematic representation of an ad data file associated with a third party advertising to be printed on an envelope by the closed system metering device of FIG. 1 or FIG. 2 in accordance with the present invention.

Referring to FIG. 5, a schematic representation of an ad data profile file 207 associated with a third party message to be printed on the envelope 20 by the mailing machine 105 is shown. The ad data includes graphic image data 207*a;* a subsidy rate data 207*b;* a billing rate 207*c* and restriction data. The restriction data may include sender restriction data, addressee restriction data and non-addressee (quantitative) restriction data, or any combination of types of restriction data. Preferably, the addressee restriction data includes geographic restriction data 207*d* and recipient restriction data 207*e*. Preferably, the non-addressee restriction data includes date restriction data 207*f,* multi-ad restriction data 207*g* and ad space restriction data 207*g*. Piece count restriction data and budget limit data defining a maximum amount of advertising charges for a given time period may also be included in the non-addressee restriction data. The graphic image data 207*a* is representative of the desired message and may be stored in any manner of well known formats, such as: PDF, JPEG, GIF and the like. The subsidy rate data 207*b* includes information corresponding to the credit value that will be applied to the user's account for authorizing printing of the third party message on the envelope 20. The billing rate data 207*c* includes information corresponding to the debit value that will be applied to the third party advertiser's account in conjunction with printing of the third party message on the envelope 20. The geographic restriction data 207*d* provides an indication of what geographic areas the third party advertiser wants to target. This may be manifested by a restriction on the originating location or the destination location or preferably both. The recipient restriction data 207*e* provides an indication of the target audience. For example, distinctions may be made between a commercial and a residential address. In the preferred embodiment, the commercial versus residential distinction may be obtained directly from the user or from the Address Matching System. Alternatively, this may also be accomplished by interrogating the recipient address 50 for certain "key words" indicative of company, such as: inc., incorporated, co., company and the like. As another example that may be used independent from or in combination with the example previously discuss, the address demographics database 212 allows further targeting of messages.

Generally, income, age and other demographic statistics are available for different regions of the country. Thus, the delivery point zip code in the recipient address 50 may be cross referenced to the address demographics database 212 and the resulting demographic statistics compared with the third party advertiser's requirements. For example, a luxury car manufacturer may only want its ads going to private residences from regions where the average income is above a predetermined threshold. The date restriction data 207*f* provides an indication of what dates the third party advertiser wants to advertise on. For example, expiration dates could be established beyond which the message would not be dispensed. As another example, periodic cycles ($1^{st}$ week of month, last week of month, on Mondays, 2 weeks before a holiday, etc.) could be established during which the message is available for printing. The multi-ad restriction data 207*g* provides an indication of whether or not the third party advertiser allows another third party advertiser to occupy to advertise on the envelope 20. The sentiment being that a multiplicity of messages will dilute the effectiveness of the individual messages versus if the individual messages were used singularly. If the third party advertiser allows other advertisers, then a reduced credit indicated in the subsidy rate data 207*b* and a reduced debit indicated in the billing rate data 207*c* might be applied when multiple messages are employed. The ad space restriction data 207*h* provides an indication of which ad zones 60*a,* 60*b,* 60*c* and 60*d* the third party advertiser authorizes for use with the message. Thus, the third party advertiser may exercise some control over where on the envelope 20 the message is printed. Similarly, as an option, the user may also provide an indication of which ad zones 60*a,* 60*b,* 60*c* and 60*d* the message may be printed in. For example, the user may be using an envelope 20 with preprinted images already occupying a portion of one or more ad zones 60*a,* 60*b,* 60*c* and 60*d*. In this scenario, the ad space restriction data 207*h* and the user's input must be reconciled. Those skilled in the art will recognize that the above described restriction data 207*d,* 207*e,* 207*f,* 207*g* and 207*h* may be utilized independently from each other or in any desired combination. Still other restrictions may be utilized, such as piece count limits. It should now be apparent that the messages that meet the restriction criteria and are available for printing represent a subset of the total number of messages that are potentially available.

Figure 6:
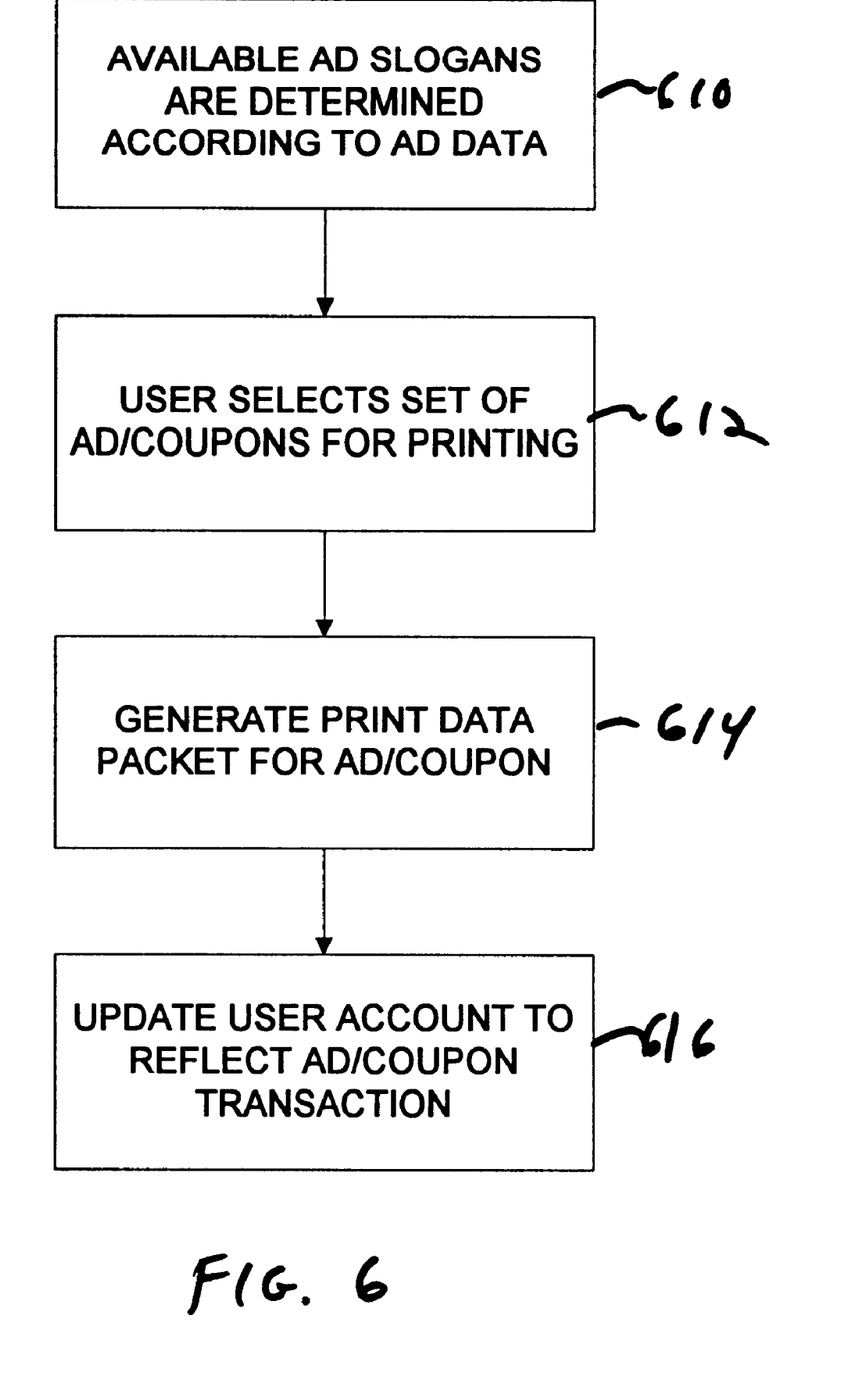
FIG. 6 is a flow chart of the process of selecting ad slogans/coupons for printing by the closed system meter devices of FIGS. 1 and 2.

Referring now primarily to FIG. 6 while referencing the structure of FIGS. 1, and 2, once the available ad slogan/coupons are determined according to the restriction data described above, at 610, the relevant messages and their corresponding subsidy rate 207*b* are presented to the user on display 168. This provides the user with the opportunity to view and analyze the available messages along with their corresponding subsidy rate 207*b*. Next, at 612, the user selects a set of messages, which may be printed on envelope 20 in conjunction with a postal indicium. For the sake of clarity and brevity, it will be assumed that only one (1) message 70 is selected for printing in ad space zone 60*a*. However, those skilled in the art will recognize that, as described above, multiple messages may be printed. The user can feed envelope 20 through mailing machine 105 to effect printing. Using the information scanned by scanner 120 from envelope 20, at step 614, processor 110 using database 170 generates a data packet for use in printing selected message 70. This is occurring contemporaneously with meter 150 creating a print data packet for the indicium to be printed on the envelope. If printer 158 is printing selected message 70, the message print data packet is sent to meter 150 which merges the two print data packets for printing the indicium and the message 70. At 616, meter 150 updates the user accounts to reflect the transaction information, such as: the date, the postage amount dispensed, the address 50, the selected message 70, the corresponding subsidy, any fees associated with providing the above described services and any other relevant data. When the user's ad subsidy account is reconciled at, for example a data center, the selected third party advertiser's account is updated to reflect the transaction information, such as: the date, the selected message 70, the corresponding advertising fee, any additional fees associated with providing the above described services and any other relevant data. At a later time, the data center exercises the preferred payment vehicle for the user and the selected third party advertiser, respectively.

Based on the above description and the associated drawings, it should now be apparent that the present invention improves the ability of third party advertisers more efficiently reach their target audience through advertising on envelopes.

Many features of the embodiments disclosed herein represent design choices selected to exploit the inventive concept as implemented in a particular virtual postage meter environment. However, those skilled in the art will recognize that various modifications can be made without departing from the spirit of the present invention. For example, the closed system postage meter 150 may be a virtual, closed system postage meter as described in U.S. patent application Ser. No. 08/993,358, filed Dec. 18, 1997, which is hereby specifically incorporated herein by reference. Other variations of this system would allow the printing of bar coded information to be done with invisible ink or on the back of the mail piece to avoid cluttering the face of the mail piece.

Therefore, the inventive concept in its broader aspects is not limited to the specific details of the preferred embodiments described above, but is defined by the appended claims and their equivalents.

What is claimed is:

1. A method for selecting and accounting for value-added services with a closed system metering device, the method comprising:

coupling a scanning device to a closed system postage meter;

scanning information, including recipient address, printed on a mailpiece;

determining if value-added services are desired;

performing accounting related to the desired value-added services;

combining the recipient address with other information relating to the postage payment for the mailpiece to obtain postal data relating to the mailpiece;

using the postal data to generate an indicium for the mailpiece, the indicium including cryptographic evidencing of postage payment;

adding graphical representation of the desired value-added services to the generated indicium to generate a value-added indicium; and printing the value-added indicium on the mailpiece.

2. The method of claim 1 wherein the scanning device is a bar code reader and the addressing information scanned on the mailpiece is printed in bar code format.

3. The method of claim 1 wherein the cryptographic evidencing of postage payment is in the form of a digital signature.

4. The method of claim 1 wherein the other information relating to the mailpiece includes at least one of date of mailing, piece count, postage amount and an identification number of the closed system postage meter.

5. The method of claim 1 wherein the determining step comprises the step of:

selecting the desired value-added services from a menu of value-added services available through the closed system metering device.

6. The method of claim 1 wherein the determining step comprises the step of:

automatically selecting the desired value-added services from the information scanned from the envelope.

7. The method of claim 1 wherein the value-added services comprises ad slogan/coupon brokering.

8. A postage metering system comprising:

a closed system meter including means for generating a indicium and means for printing the indicium;

means operatively coupled to the closed system meter for scanning information, including recipient address, printed on an envelope; and means operatively coupled to the closed system meter for selecting value-added services corresponding to the envelope;

wherein the generating means generates the indicium using the scanned information including the recipient address, the indicium including graphical representation of the value-added services, and the printing means prints the indicium on the envelope, said closed system meter further including means for accounting for the generated indicium and the value-added services.

9. The system of claim 8 wherein the means for generating an indicium includes a cryptographic operation using the scanned information.

10. The system of claim 8 wherein the scanning means comprises a bar code scanner and the scanned information is printed in bar code format on the envelope.

11. The system of claim 8 wherein the scanning means comprises an OCR reader and the scanned information is printed in alphanumeric format on the envelope.

12. The system of claim 8 wherein the closed system meter is operatively coupled to a mailing machine.

* * * * *